United States Patent
Howell et al.

(10) Patent No.: US 7,380,936 B2
(45) Date of Patent: Jun. 3, 2008

(54) EYEGLASSES WITH A CLOCK OR OTHER ELECTRICAL COMPONENT

(75) Inventors: Thomas A. Howell, Palo Alto, CA (US); David Chao, Saratoga, CA (US); C. Douglass Thomas, Campbell, CA (US); Peter P. Tong, Mountain View, CA (US)

(73) Assignee: IpVenture, Inc., Los Altos, CA (US)

( * ) Notice: Subject to any disclaimer, the term of this patent is extended or adjusted under 35 U.S.C. 154(b) by 283 days.

(21) Appl. No.: 11/183,263

(22) Filed: Jul. 15, 2005

(65) Prior Publication Data

US 2006/0001827 A1    Jan. 5, 2006

Related U.S. Application Data

(60) Provisional application No. 60/647,836, filed on Jan. 31, 2005, provisional application No. 60/647,826, filed on Jan. 31, 2005, provisional application No. 60/620,238, filed on Oct. 18, 2004, provisional application No. 60/618,107, filed on Oct. 12, 2004, provisional application No. 60/605,191, filed on Aug. 28, 2004, provisional application No. 60/592,045, filed on Jul. 28, 2004.

(51) Int. Cl.
*G02C 1/00* (2006.01)
(52) U.S. Cl. .......................................... 351/158; 351/41
(58) Field of Classification Search ................ 351/158, 351/41, 51, 52, 121; 248/442
See application file for complete search history.

(56) References Cited

U.S. PATENT DOCUMENTS

| | | | |
|---|---|---|---|
| 320,558 | A | 6/1885 | Hull |
| 669,949 | A | 3/1901 | Underwood |
| 1,255,265 | A | 2/1918 | Zachara |
| 2,638,532 | A | 5/1953 | Brady |
| 2,904,670 | A | 9/1959 | Calmes |
| 3,060,308 | A | 10/1962 | Fortuna |
| 3,597,054 | A | 8/1971 | Winter |
| 3,710,115 | A | 1/1973 | Jubb |

(Continued)

FOREIGN PATENT DOCUMENTS

CN    88203065    11/1988

(Continued)

OTHER PUBLICATIONS

"±1.5g Dual Axis Micromachined Accelerometer", Freescale Semiconductor, Inc., Motorola Semiconductor Technical Data, MMA6260Q, 2004, pp. 1-7.

(Continued)

*Primary Examiner*—Hung X. Dang

(57) ABSTRACT

A pair of glasses includes a clock that is at least partially embedded in the glasses. The clock can be in one of the temples of the glasses. In one implementation, the clock can be positioned at a region close to a hinge of the corresponding temple, with the clock facing inward towards the user. The clock can also be in a temple arrangement. Instead of or in addition to a clock, other types of electrical components can be at least partially embedded into a pair of glasses or a temple arrangement of a pair of glasses. For example, the other electrical components can pertain to a RFID tag, a temperature sensor or an eyewear finder.

21 Claims, 5 Drawing Sheets

U.S. PATENT DOCUMENTS

| | | |
|---|---|---|
| 4,165,487 A | 8/1979 | Corderman |
| 4,254,451 A | 3/1981 | Cochran, Jr. |
| 4,283,127 A | 8/1981 | Rosenwinkel et al. |
| 4,322,585 A | 3/1982 | Liautaud |
| 4,348,664 A | 9/1982 | Boschetti et al. |
| 4,389,217 A | 6/1983 | Baughman et al. |
| 4,526,473 A | 7/1985 | Zahn, III |
| 4,608,492 A | 8/1986 | Burnham |
| 4,683,587 A | 7/1987 | Silverman |
| 4,751,691 A | 6/1988 | Perera |
| 4,757,714 A | 7/1988 | Purdy et al. |
| 4,773,095 A | 9/1988 | Zwicker et al. |
| 4,806,011 A * | 2/1989 | Bettinger .................... 351/158 |
| 4,822,160 A | 4/1989 | Tsai |
| 4,822,161 A | 4/1989 | Jimmy |
| 4,942,629 A | 7/1990 | Stadlmann |
| 4,985,632 A | 1/1991 | Bianco et al. |
| 5,008,548 A | 4/1991 | Gat |
| 5,020,150 A | 5/1991 | Shannon |
| 5,036,311 A | 7/1991 | Moran et al. |
| 5,050,150 A | 9/1991 | Ikeda |
| 5,093,576 A | 3/1992 | Edmond et al. |
| 5,148,023 A | 9/1992 | Hayashi et al. |
| 5,151,600 A | 9/1992 | Black |
| 5,161,250 A | 11/1992 | Ianna et al. |
| 5,172,256 A | 12/1992 | Sethofer et al. |
| 5,306,917 A | 4/1994 | Black et al. |
| 5,353,378 A | 10/1994 | Hoffman et al. |
| 5,359,370 A | 10/1994 | Mugnier |
| 5,367,345 A | 11/1994 | da Silva |
| 5,379,464 A | 1/1995 | Schleger et al. |
| 5,382,986 A | 1/1995 | Black et al. |
| 5,394,005 A | 2/1995 | Brown et al. |
| 5,452,480 A | 9/1995 | Ryden |
| 5,455,640 A * | 10/1995 | Gertsikov .................... 351/158 |
| 5,457,751 A | 10/1995 | Such |
| 5,500,532 A | 3/1996 | Kozicki |
| D369,167 S | 4/1996 | Hanson et al. |
| 5,513,384 A | 4/1996 | Brennan et al. |
| 5,533,130 A | 7/1996 | Staton |
| 5,581,090 A | 12/1996 | Goudjil |
| 5,589,398 A | 12/1996 | Krause et al. |
| 5,590,417 A | 12/1996 | Rydbeck |
| 5,608,808 A | 3/1997 | da Silva |
| 5,634,201 A | 5/1997 | Mooring |
| 5,737,436 A | 4/1998 | Boyden et al. |
| 5,900,720 A | 5/1999 | Kallman et al. |
| 5,946,071 A | 8/1999 | Feldman |
| 5,966,746 A | 10/1999 | Reedy et al. |
| 5,980,037 A | 11/1999 | Conway |
| 5,988,812 A | 11/1999 | Wingate |
| 5,992,996 A | 11/1999 | Sawyer |
| 5,995,592 A | 11/1999 | Shirai et al. |
| 6,010,216 A | 1/2000 | Jesiek |
| 6,013,919 A | 1/2000 | Schneider et al. |
| 6,028,627 A | 2/2000 | Helmsderfer |
| 6,046,455 A | 4/2000 | Ribi et al. |
| 6,060,321 A | 5/2000 | Hovorka |
| 6,061,580 A | 5/2000 | Altschul et al. |
| 6,091,546 A | 7/2000 | Spitzer |
| 6,091,832 A | 7/2000 | Shurman et al. |
| 6,154,552 A | 11/2000 | Koroljow et al. |
| 6,236,969 B1 | 5/2001 | Ruppert et al. |
| 6,243,578 B1 | 6/2001 | Koike |
| 6,292,213 B1 | 9/2001 | Jones |
| 6,301,367 B1 | 10/2001 | Boyden et al. |
| 6,307,526 B1 | 10/2001 | Mann |
| 6,343,858 B1 | 2/2002 | Zelman |
| 6,349,001 B1 | 2/2002 | Spitzer |
| 6,349,422 B1 | 2/2002 | Schleger et al. |
| 6,426,719 B1 | 7/2002 | Nagareda et al. |
| 6,478,736 B1 | 11/2002 | Mault |
| 6,506,142 B2 | 1/2003 | Itoh et al. |
| 6,513,532 B2 | 2/2003 | Mault et al. |
| 6,517,203 B1 | 2/2003 | Blum et al. |
| 6,539,336 B1 | 3/2003 | Vock et al. |
| 6,542,081 B2 | 4/2003 | Torch |
| 6,554,763 B1 | 4/2003 | Amano et al. |
| 6,619,799 B1 | 9/2003 | Blum et al. |
| 6,629,076 B1 | 9/2003 | Haken |
| 6,729,726 B2 | 5/2004 | Miller et al. |
| 6,736,759 B1 | 5/2004 | Stubbs et al. |
| 6,764,194 B1 | 7/2004 | Cooper |
| 6,792,401 B1 | 9/2004 | Nigro et al. |
| 6,929,365 B2 | 8/2005 | Swab et al. |
| 7,013,009 B2 | 3/2006 | Warren |
| 7,031,667 B2 | 4/2006 | Horiguchi |
| 7,073,905 B2 | 7/2006 | Da Pra' |
| 7,192,136 B2 | 3/2007 | Howell et al. |
| 7,255,437 B2 | 8/2007 | Howell et al. |
| 2001/0005230 A1 | 6/2001 | Ishikawa |
| 2002/0081982 A1 | 6/2002 | Schwartz et al. |
| 2002/0084990 A1 | 7/2002 | Peterson, III |
| 2002/0089639 A1 | 7/2002 | Stamer et al. |
| 2002/0090103 A1 | 7/2002 | Calisto, Jr. |
| 2002/0098877 A1 | 7/2002 | Glezerman |
| 2002/0109600 A1 | 8/2002 | Mault et al. |
| 2002/0140899 A1 | 10/2002 | Blum et al. |
| 2002/0197961 A1 | 12/2002 | Warren |
| 2003/0022690 A1 | 1/2003 | Beyda et al. |
| 2003/0032449 A1 | 2/2003 | Globbi |
| 2003/0062046 A1 | 4/2003 | Weismann |
| 2003/0065257 A1 | 4/2003 | Mault et al. |
| 2003/0067585 A1 | 4/2003 | Miller et al. |
| 2003/0068057 A1 | 4/2003 | Miller et al. |
| 2003/0226978 A1 | 12/2003 | Ribl et al. |
| 2004/0000733 A1 | 1/2004 | Swab et al. |
| 2004/0063378 A1 | 4/2004 | Nelson |
| 2004/0096078 A1 | 5/2004 | Lin |
| 2004/0150986 A1 | 8/2004 | Chang |
| 2004/0156012 A1 | 8/2004 | Jannard et al. |
| 2004/0157649 A1 | 8/2004 | Jannard et al. |
| 2004/0160571 A1 | 8/2004 | Jannard |
| 2004/0160572 A1 | 8/2004 | Jannard |
| 2005/0213026 A1 | 9/2005 | Da Pra' |
| 2005/0230596 A1 | 10/2005 | Howell et al. |
| 2005/0248717 A1 | 11/2005 | Howell et al. |
| 2005/0248719 A1 | 11/2005 | Howell et al. |
| 2005/0264752 A1 | 12/2005 | Howell et al. |
| 2006/0001827 A1 | 1/2006 | Howell et al. |
| 2006/0003803 A1 | 1/2006 | Thomas et al. |
| 2006/0023158 A1 | 2/2006 | Howell et al. |
| 2007/0030442 A1 | 2/2007 | Howell et al. |
| 2007/0046887 A1 | 3/2007 | Howell et al. |
| 2007/0109491 A1 | 5/2007 | Howell et al. |
| 2007/0186330 A1 | 8/2007 | Howell et al. |

FOREIGN PATENT DOCUMENTS

| | | |
|---|---|---|
| CN | 89214222.7 | 3/1990 |
| CN | 90208199.3 | 11/1990 |
| EP | 1134491 A2 | 9/2001 |
| FR | 2530039 A1 | 1/1984 |
| GB | 1467982 | 3/1977 |
| JP | 58-113912 | 7/1983 |
| JP | 58-113914 | 7/1983 |
| JP | 02-181722 | 7/1990 |
| JP | 09-017204 | 1/1997 |
| JP | 10-161072 | 6/1998 |
| JP | 2000-039595 | 2/2000 |
| TW | 484711 | 6/2001 |
| WO | WO 97/12205 A1 | 4/1997 |
| WO | WO 02/06881 A2 | 1/2002 |
| WO | WO 03/069394 A1 | 8/2003 |

| | | |
|---|---|---|
| WO | WO 03/100368 A1 | 12/2003 |
| WO | WO 2004/012477 A2 | 2/2004 |
| WO | WO 2004/025554 A1 | 3/2004 |

OTHER PUBLICATIONS

"APA Announces Shipment of the SunUV™ Personal UV Monitor", Press Release, Nov. 7, 2003, pp. 1-3.
"Camera Specs Take Candid Snaps", BBC News, Sep. 18, 2003, pp. 1-3.
"Cardo Wireless Attaching Clips and Wearing Headset", Cardo Systems, Inc., http://www.cardowireless.com/clips.php, downloaded Nov. 27, 2004, pp. 1-3.
"Environmental Health Criteria 14: Ultraviolet Radiation", International Programme on Chemical Safety, World Health Organization Geneva, 1979 http://www.ichem.org., pp. 1-102.
"Eyetop", Product-Features, eyetop eyewear, eyetop belt worn, http://www.eyetop.net/products/eyetop/features.asp., downloaded Nov. 6, 2003, pp. 1-2.
"Exclusive Media Event Marks Debut of Oakley Thump: World's First Digital Audio Eyewear", Oakley Investor Relations, Press Release, Nov. 15, 2004, pp. 1-2.
"Heart Rate Monitors", http://www.healthgoods.com, downloaded Dec. 4, 2004.
"How is the UV Index Calculated", SunWise Program, U.S. Environmental Protection Agency, http://www.epa.gov/sunwise/uvcalc.html, downloaded Oct. 14, 2004, pp. 1-2.
"Industrial UV Measurements", APA Optics, Inc., http://www.apaoptics.com/uv/, downloaded Jul. 12, 2004, p. 1.
"Motorola and Oakley Introduce First Bluetooth Sunglasses-Cutting Edge RAZRWire Line Offers Consumers On-The-Go Connections", Motorola Mediacenter-Press Release, Feb. 14, 2005, pp. 1-2.
"Oakley Thump: Sunglasses Meet MP3 Player", with Image, http://news.designtechnica.com/article4665.html, Jul. 13, 2004.
"Personal UV monitor," Optics.org, http://optics.org/articles/news/6/6/7/1 (downloaded Dec. 20, 2003), Jun. 9, 2000, pp. 1-2.
"SafeSun Personal Ultraviolet Light Meter", http://healthchecksystems.com/safesun.htm, downloaded Jul. 12, 2004, pp. 1-4.
"SafeSun Personal UV Meter", Introduction, Optix Tech Inc., http://www.safesun.com, downloaded Feb. 5, 2004, pp. 1-2.
SafeSun Personal UV Meter, features, Optix Tech Inc., http://www.safesun.com/features.html, downloaded May 1, 2004, pp. 1-2.
"Sharper Image—The FM Pedometer", e-Corporate Gifts.com, http://www.e-corporategifts.com/sr353.html, downloaded Jan. 22, 2005, pp. 1-2.
"Sun UV ™ Personal UV Monitor". APA Optics, Inc., http://www.apaoptics.com/sunuv/uvfacts.html, downloaded Dec. 20, 2003, pp. 1-3.
"Ultraviolet Light and Sunglasses", Oberon's Frequently Asked Questions, http://www.oberoncompany.com/OBEnglish/FAQUV.html, downloaded Feb. 5, 2004, pp. 1-2.
"Ultraviolet Light Sensor", Barrett & Associates Engineering, http://www.barrettengineering.com/project_uvs.htm, downloaded Feb. 5, 2004, pp. 1-3.
"Ultraviolet Radiation (UVR)", Forum North, Ontario Ministry of Labour, http://www3.mb.sympatico.ca/~ericc/ULTRAVIOLET%20RADIATION.htm, downloaded Feb. 5, 2004, pp. 1-6.
"What ARe Gripples?", Gripping Eyewear, Inc., http://www.grippingeyewear.com/whatare.html, downloaded Nov. 2, 2005.
"With Racing Heart", Skaloud et al, GPS World, Oct. 1, 2001, http://www.gpsworld.com/gpsworld/content/printContentPopup.jsp?id=1805, pp. 1-5.
Abrisa Product Information: Cold Mirrors, Abrisa, date unknown, p. 1.
Abrisa Product Information: Commercial Hot Mirror, Abrisa, date unknown, p. 1.
Alps Spectable, Air Conduction Glass, Bone Conduction Glass, htt,://www.alps-inter.com/spec.htm, downloaded Dec. 10, 2003, pp. 1-2.
Altimeter and Compass Watches, http://store.yahoo.com/snowshack/altimeter-watches.html, downloaded May 3, 2004, pp. 1-2.
Bone Conduction Headgear HG16 Series, "Voiceducer," http://www.temco-j.co.jp/html/English/HG18.html, downloaded Dec. 10, 2003, pp. 1-3.
Carmoy, David, "The Ultimate MP3 Player for Athletes? Could be.", CNET Reviews, May 14, 2004, pp. 1-4.
Clifford, Michelle A., "Accelerometers Jump into the Consumer Goods Market", Sensors Online, http://www.sensorsmag.com, Aug. 2004.
Cool Last Minute Gift Ideas!, UltimateFatBurner Reviews and Articles, http://www.ultimatefatburner.com/gift-ideas.html, downloaded May 10, 2005, pp. 1-3.
Comfees.com, Adjustable Sports Band Style No. 1243, http://shop.store.yahoo.com/comfees/adsporbansty.html, downloaded Apr. 18, 2003, pp. 1-2.
Dixen, Brian, "ear-catching", Supertesten, Mobil, date unknown, pp. 37-41.
Global Solar UV Index, A Practical Guide, World Health Organization, 2002, pp. 1-28.
Grobart, Sam, "Digit-Sizing Your Computer Data", News Article, Sep. 2004, p. 1.
Life Monitor V1.1, Rhusoft Technologies Inc., http://www.rhusoft.com/lifemonitor/, Mar. 1, 2003, pp. 1-6.
Manes, Stephen, "Xtreme Cam", Forbes Magazine, Sep. 5, 2005, p. 96.
Mlo, PhysiCal, http://www.gophysical.com/, downloaded Jan. 27, 2004, 5 pages.
Monitoring Athletes Performance—2002 Winter Olympic News from KSL, Jan. 23, 2002, http://2002.ksl.com/news-3885i.php, pp. 1-3.
NIWA, "UV Index Information", http://www.niwa.cri.nz/services/uvozone/uvl-info, downloaded Jul. 15, 2004, pp. 1-2.
Pärkkä, Juha, et al., "A Wireless Wellness Monitor for Personal Weight Management", VTT Information Technology, Tampere, Finland, date unknown, p. 1.
Pedometer, Model HJ-112, Omron Instruction Manual, Omron Healthcare, Inc., 2003, pp. 1-27.
PNY Announces Executive Attaché USB 2.0 Flash Drive and Pen Series, Press Release, PNY Technologies, Las Vegas, Jan. 8, 2004, pp. 1-2.
PNY Technologies, "Executive Attaché" http://www.pny.com/products/flash/execattache.asp downloaded Nov. 16, 2005.
Polar WM41 and 42 weight management monitor, http://www.simplysports/polar/weight_management/wm41-42.htm, downloaded Jan. 28, 2004, pp. 1-3.
Questions Answers, Pedometer.com, http:/www.pedometer.com, downloaded May 5, 2005.
RazrWire, Motorola, 2005, 1 page.
SafeSun Personal UV Meter, Scientific Data, Optix Tech Inc., http://www.safesun.com/scientific.html, downloaded May 1, 2003, pp. 1-3.
SafeSun Sensor, User's Manual Optix Tech Inc., date unknown.
SafeSun, Personal UV Meter, "Technical Specifications", Optix Tech Inc., http://www.safesun.com/technical.html, downloaded Jul. 12, 2004, pp. 1-2.
SafeSun, Personal UV Meter, Experiments, Optix Tech Inc., http://www.safesun.com/experiments.html, downloaded Feb. 5, 2004, pp. 1-2.
Shades of Fun, Blinking Light Glasses, http://www.shadesoffun.com/Nov/Novpgs-14.html, downloaded Jul. 9, 2005, pp 1-4.
SportLine Fitness Pedometer-Model 360, UltimateFatBurner Superstore, http://www.ultimatefatburner-store.com/ac_004.html, downloaded May 10, 2005, pp. 1-2.
Steele, Bonnie G. et al., "Bodies in motion: Monitoring daily activity and exercise with motion sensors in people with chronic pulmonary disease", VA Research & Development, Journal of Rehabilitation Research & Development, vol. 40, No. 5, Sep./Oct. 2003, Supplement 2, pp. 45-58.
Stevens, Kathy, "Should I Use a Pedometer When I Walk?", Healtheon/WebMD, Apr. 14, 2000.

Sundgot, Jørgen "2nd-gen Motorola Bluetooth headset", InfoSync World, Mar. 1, 2003, http://www.Infosync.no/news/2002/n/2841.html, pp. 1-2.

SunSensors, Segan Industries, Inc., http://www.segan-Ind.com/sunsensor.htm, downloaded Feb. 5, 2004, pp. 1-3.

SunUV™, Personal UV Monitor, APA Optics, Inc., http://www.apaoptics.com/sunuv/models.html, downloaded Dec. 20, 2003.

SunUV™, Personal UV Monitor User's Guide, APA Optics, Inc., 2003 pp. 1-52.

Talking Pedometer, Sportline, Inc., date unknown.

Top Silicon PIN Photodiode, PD93-21C, Technical Data Sheet, Everlight Electronics Co., Ltd., 2004, pp. 1-9.

UV Light Meter, UVA and UVB measurement, UV-340, Instruction Manual, Lutron, date unknown, pp. 1-5.

UV-Smart, UVA/B Monitor, Model EC-960-PW, Instruction Manual, Tanita Corporation of America, Inc., downloaded Nov. 16, 2001.

Vitaminder Personal Carb Counter with Convenient Key Chain, date unknown, pp. 1-4.

* cited by examiner

EYEGLASSES WITH A CLOCK OR OTHER ELECTRICAL COMPONENT

CROSS-REFERENCE TO RELATED APPLICATIONS

This application is related to U.S. patent application Ser. No. 10/964,011, filed Oct. 12, 2004, and entitled "TETHERED ELECTRICAL COMPONENTS FOR EYEGLASSES," which is hereby incorporated herein by reference, which in turn claims priority to each of: (i) U.S. Provisional Patent Application No. 60/509,631, filed Oct. 9, 2003, and entitled "TETHERED ELECTRICAL COMPONENTS FOR EYEGLASSES," which is hereby incorporated herein by reference; (ii) U.S. Provisional Patent Application No. 60/527,565, filed Dec. 8, 2003, and entitled "ADAPTABLE COMMUNICATION TECHNIQUES FOR ELECTRONIC DEVICES," which is hereby incorporated herein by reference; (iii) U.S. Provisional Patent Application No. 60/562,798, filed Apr. 15, 2004, entitled "EYEWEAR WITH ULTRAVIOLET DETECTION SYSTEM," and which is hereby incorporated herein by reference; (iv) U.S. Provisional Patent Application No. 60/583,169, filed Jun. 26, 2004, entitled "ELECTRICAL COMPONENTS FOR USE WITH EYEWEAR, AND METHODS THEREFOR," and which is hereby incorporated herein by reference; (v) U.S. Provisional Patent Application No. 60/592,045, filed Jul. 28, 2004, entitled "EYEGLASSES WITH A CLOCK OR OTHER ELECTRICAL COMPONENT," and which is hereby incorporated herein by reference; and (vi) U.S. Provisional Patent Application No. 60/605,191, filed Aug. 28, 2004, entitled "ELECTRICAL COMPONENTS FOR USE WITH EYEWEAR, AND METHODS THEREFOR," and which is hereby incorporated herein by reference.

The application claims priority to each of: (i) U.S. Provisional Patent Application No. 60/592,045, filed Jul. 28, 2004, entitled "EYEGLASSES WITH A CLOCK OR OTHER ELECTRICAL COMPONENT," and which is hereby incorporated herein by reference; (ii) U.S. Provisional Patent Application No. 60/605,191, filed Aug. 28, 2004, entitled "ELECTRICAL COMPONENTS FOR USE WITH EYEWEAR, AND METHODS THEREFOR," and which is hereby incorporated herein by reference; (iii) U.S. Provisional Patent Application No. 60/618,107, filed Oct. 12, 2004, and entitled "TETHERED ELECTRICAL COMPONENTS FOR EYEGLASSES," which is hereby incorporated herein by reference; (iv) U.S. Provisional Patent Application No. 60/620,238, filed Oct. 18, 2004, entitled "EYEGLASSES WITH HEARING ENHANCED AND OTHER AUDIO SIGNAL-GENERATING CAPABILITIES," and which is hereby incorporated herein by reference; (v) U.S. Provisional Patent Application No. 60/647,836, filed Jan. 31, 2005, and entitled "EYEGLASSES WITH HEART RATE MONITOR," which Is hereby incorporated herein by reference; and (vi) U.S. Provisional Patent Application No. 60/647,826, filed Jan. 31, 2005, and entitled "EYEWEAR WITH ELECTRICAL COMPONENTS," which is hereby incorporated herein by reference.

In addition, this application is related to each of: (i) U.S. patent application Ser. No. 10/822,218, filed Apr. 12, 2004, and entitled "EYEGLASSES FOR WIRELESS COMMUNICATIONS," which is hereby incorporated herein by reference; (ii) U.S. patent application Ser. No. 10/964,011, filed Oct. 12, 2004, and entitled "TETHERED ELECTRICAL COMPONENTS FOR EYEGLASSES," which is hereby incorporated herein by reference; (iii) U.S. patent application Ser. No. 11/006,343, filed Dec. 7, 2004, and entitled "ADAPTABLE COMMUNICATION TECHNIQUES FOR ELECTRONIC DEVICES," which is hereby incorporated herein by reference; (iv) U.S. patent application Ser. No. 11/078,855, filed Mar. 11, 2005, and entitled "EYEWEAR WITH RADIATION DETECTION SYSTEM," which is hereby incorporated herein by reference; (v) U.S. patent application Ser. No. 11/078,857, filed Mar. 11, 2005, and entitled "RADIATION MONITORING SYSTEM," which is hereby incorporated herein by reference; (vi) U.S. patent application Ser. No. 11/183,269 filed Jul. 15, 2005, and entitled "EYEWEAR SUPPORTING AFTER-MARKET ELECTRICAL COMPONENTS," which is hereby incorporated herein by reference; (vii) U.S. patent application Ser. No. 11/183,283, filed Jul. 15, 2005, and entitled "EVENT EYEGLASSES," which is hereby incorporated herein by reference; (viii) U.S. patent application Ser. No. 11/183,262, filed Jul. 15, 2005, and entitled "EYEGLASSES WITH HEARING ENHANCED AND OTHER AUDIO SIGNAL-GENERATING CAPABILITIES," which is hereby incorporated herein by reference; (ix) U.S. patent application Ser. No. 11/183,256, filed Jul. 15, 2005, and entitled "EYEGLASSES WITH ELECTRICAL COMPONENTS," which is hereby incorporated herein by reference; and (x) U.S. patent application Ser. No. 11/183,276, filed Jul. 15, 2005, now U.S. Pat. No. 7,255,437, and entitled "EYEGLASSES WITH ACTIVITY MONITORING," which is hereby incorporated herein by reference.

FIELD OF THE INVENTION

The present invention relates generally to glasses and, more particularly, to a pair of eyeglasses with a clock or other electrical component.

BACKGROUND OF THE INVENTION

For some people, glasses are indispensable. They have to wear them almost every second of their waking hours. Even for those who do not wear prescription glasses, if they like to be in the sun, sunglasses are essential. In other words, many of us constantly carry at least one pair of glasses with us.

Many of us also have to regularly wear or carry a watch or other electrical devices. Some people are already burdened by carrying too many separate devices and it can be expensive and inconvenient when a device is lost or forgotten.

Another interesting aspect in the glasses industry is that once you have bought a pair of glasses, they cannot be altered. Some of these glasses can be quite expensive, particularly those with a famous brand name. After-market enhancements or modifications to a pair of glasses are not readily available.

It should also be apparent from the foregoing that there is a continuing need to reduce the number of separate components or gadgets one tends to carry, and there is also a need to facilitate after-market enhancements or modifications for a pair of glasses.

SUMMARY OF THE INVENTION

In one embodiment, the present invention relates to having a clock at least partially embedded in a pair of glasses. With the clock at least partially embedded in the glasses, the wearer does not need to carry a separate watch in order to know what time it is. For example, the clock can be in one of the temples of the glasses at a region close to the hinge of that temple, with the clock facing the wearer. With the clock in that position, the wearer may be able to see the time or the time may be visible to the wearer, without the need to take the glasses off. In an alternative example, the clock, which can be a digital clock, can be in a temple arrangement of a pair of glasses. A temple arrangement can be a temple tip, a temple cover or a temple fit-over. In another embodiment, instead of a clock, the present invention relates to an electrical component at least partially embedded into a pair of glasses or a temple arrangement of a pair of glasses. Due to the miniaturization of electrical components, even a physically small electrical component can provide significant and useful functionalities. In one example, an electrical component in a pair of glasses is a temperature sensor. In another example, an electrical component in a pair of glasses is an RFID tag. In still another example, an electrical component in a pair of glasses is an eyewear finder.

Other aspects and advantages of the present invention will become apparent from the following detailed description, which, when taken in conjunction with the accompanying drawings, illustrates by way of example the principles of the invention.

Same numerals in FIGS. 1-5 are assigned to similar elements in all the figures. Embodiments of the invention are discussed below with reference to FIGS. 1-5. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
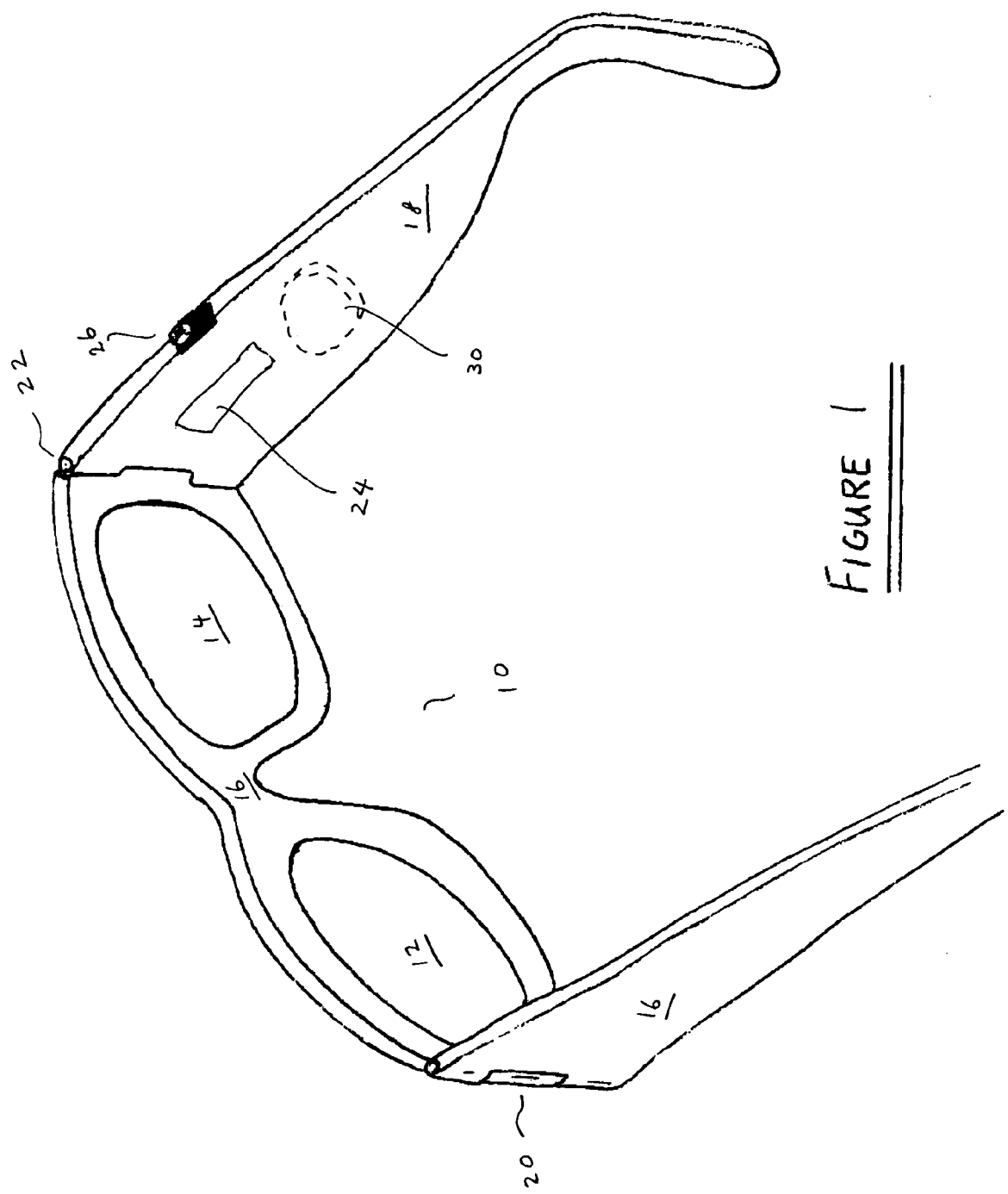
FIG. 1 shows one embodiment of the invention with a clock in one of the temples of the glasses.

FIG. 1 shows a pair of glasses according to one embodiment of the present invention. The pair of glasses 10 has a first lens holder 12 and a second lens holder 14. Both lens holders 12, 14 are for receiving lenses. The first lens holder 12 has a first side and a second side. The second lens holder 14 also has a first side and a second side. The pair of glasses has a bridge element 16. The bridge element 16 is coupled to the first side of the first lens holder 12 and the second side of the second lens holder 14. In one embodiment, the lens holders and the bridge element 16 are not separate pieces, but are an integral piece.

The pair of glasses 10 also includes a first temple 16 and a second temple 18. The first temple 16 is pivotally secured to the second side of the first lens holder 12 through a joint or hinge 20. The second temple 18 is pivotally secured to the first side of the second lens holder 14 through another joint or hinge 22.

The glasses 10 shown in FIG. 1 also include a clock 24, which is at least partially embedded in the glasses 10. In one embodiment, the clock 24 can be in the temple 18 of the glasses 10 at a region close to its corresponding joint 22. The clock 24 is facing a user when the user is wearing the glasses. With the clock in that position, in some implementations, the wearer is able to see the time without the need to take the glasses off.

The clock 24 can be a digital clock (or a digital alarm clock) with a liquid crystal display (LCD) or other types of electronic display. In another example, the clock is an analog clock, or other type of clock.

The glasses 10 can also include a switch 26 that can be used to adjust the time of the clock 24. The switch 26 can be a push button, or a knob that one can adjust or rotate, similar to the knob in an analog watch. Different types of switches are applicable. In one embodiment, the clock 24 is a digital clock and the switch 26 is an electrical switch. Different types of switches have previously been described in the related patent applications mentioned above and incorporated by reference.

A battery 30 can also be provided in the glasses 10 to power the clock 24. In one embodiment, the glasses 10 include a hatch that can be opened to replace the battery 30. The hatch can be facing the wearer when the glasses 10 are worn. In another embodiment, the glasses 10 do not include a hatch for facilitating changing of the battery. In this embodiment, the glasses are designed so that once the power in the battery is depleted, the battery cannot be replaced without breaking the glasses. In still another embodiment, the battery can be rechargeable by way of coupling to a charger or by way of a solar cell coupled to or partially embedded in the glasses.

In the embodiment, where the clock is a digital clock, the clock can be programmable.

In one embodiment, the clock is an alarm clock, and there is also a speaker at least partially embedded in the glasses 10. As an example, the speaker can be a beeper. In another embodiment, the alarm clock can be programmable to audibly alert a user at a specific time using an audible output from the speaker. In the various related patent applications mentioned above and incorporated by reference, many ways to at least partially embed a speaker into a temple are described.

In another embodiment, the clock is a digital clock with a display. The glasses can further include a switch that turns the display on and off. Sometimes, the wearer may not want to be reminded of time. In this embodiment, the clock itself can be turned off. In another embodiment, the clock is a digital clock with a LCD and an electrical switch. The electrical switch can turn off the LCD, while the clock is still running or is still continuously operating.

In one embodiment, there is a slidable lid (or cover) over the face of the clock. One can slide the lid to cover the face of the clock.

In one embodiment, the clock displays only the time of day. In another embodiment, the clock displays not only time, but also the date and the day of week. The size of the display can be smaller if only the time of day is displayed. The time, date and day can be displayed simultaneously. Alternatively, the display can cycle through displaying time, date, and day, thereby providing a sequential display of such information.

In yet another embodiment, a housing for the clock includes a light source next to the clock to help the wearer see the time. For example, a light emitting diode can be provided next to the clock, and the light emitting diode can be turned on/off. In yet another embodiment, there is a cavity in the glasses and the clock is a self-contained clock with its own battery, i.e., a clock module. The clock module is placed in the cavity. A cavity is then closed and sealed to keep the clock module inside the glasses. The clock can be a digital clock and the digital clock may only display the time of day. In one embodiment, the clock can also set its time, date and/or day by a wireless signal. For example, the clock can include a wireless receiver to acquire the wireless signal. The wireless signal can be acquired from a network, such as a WiFi or Cellular network. The wireless signal can also be acquired from a broadcast. For example, the NIST radio station WWVB broadcasts signals that can be used to synchronize consumer electronic products, like clocks.

In the embodiment shown in FIG. 1, the clock faces inside, towards the wearer when the glasses are being worn. Alternatively, the clock could be facing out and the user can temporarily remove the glasses to read the time.

A clock can be based on separate light sources. In one embodiment, the clock display is at least partially embedded in the lens holders of a pair of glasses. There can be twelve (12) light sources located all around each lens holder. The light sources could be LEDs or LCDs. The light sources around the left lens holder can show the hour, and the light sources around the right lens holder can show the minutes, which can be rounded to the nearest five minutes. As another example, the light sources can be around one of the lens holders, with different colors or other visual clues used to distinguish hours and minutes. There can be a switch provided with the pair of glasses to temporarily activate the display. For example, the switch can be located at the bridge or temple of the glasses. In one embodiment, the lens holders can be made of translucent materials.

In one embodiment, a clock can be in a temple arrangement of the glasses.

Referring back to FIG. 1, each temple has two ends, the first end and the second end. The first end is the end that is pivotally secured to its corresponding hinge. In one embodiment, the second end of one or both temples has a temple arrangement.

For some glasses, particularly when a pair of glasses has not been extensively worn, a temple arrangement, such as a temple tip, can be relatively easily removed and re-inserted into the glasses. As result, temple arrangements of different color and/or shape and/or having different electrical components can be applied to the same frame of a pair of glasses. Retailers or distributors can then provide after-market modification or enhancement to a pair of glasses, at the preference of their consumers. This, for example, can be done by replacing existing temple tips with replacement temple tips. Or, a consumer can identify the preferred temple arrangements to be sold with the glasses. Different embodiments on after-market enhancement and/or modification of glasses have previously been described in the related patent applications mentioned above and incorporated by reference.

Figure 2:
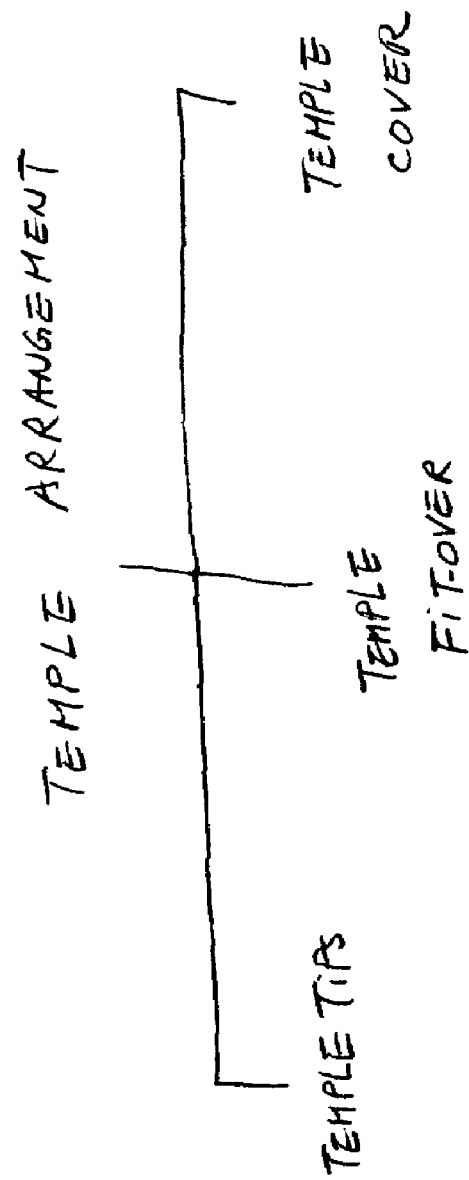
FIG. 2 shows a number of different embodiments of temple arrangements according to the present invention.

FIG. 2 shows a number of different embodiments of temple arrangements according to the present invention. For example, a temple arrangement can be a temple tip, which is usually associated with a rearward position of the temple.

In another embodiment, a temple arrangement is a temple cover, or a temple fit-over. A temple cover slides over and at least partially covers a portion of the second end of a temple. If the second end of the temple has a temple tip, at least a portion of the temple tip can be covered by the temple cover. A temple fit-over fits over at least a portion of the second end of a temple. If the second end of the temple has a temple tip, at least a portion of the temple tip is fitted over by the temple fit-over. A temple cover is typically made of a material that is more flexible than a temple fit-over. For example, a temple cover can be a fabric or other materials, such as a sock or sleeve; while a temple fit-over can be made of plastic.

A temple arrangement can be made of the same or different materials than the temple. To illustrate, a pair of glasses with a metal frame can have non-metallic temple tips. A temple arrangement can be of a color that is the same as, or similar to, or different from, that of the temple.

A temple arrangement can be held onto a temple by frictional force. If the temple arrangement is a temple fit-over, it can be held onto a temple tip by frictional force. In another embodiment, a temple arrangement is permanently held onto its corresponding temple or temple tip. This can be done by adhesive or glue.

In different embodiments, the glasses 10 can be, for example, a pair of sunglasses, fit-over glasses, reading glasses, prescription glasses, or safety glasses. In other embodiments, the glasses 10 can be, for example, a pair of sports glasses, protective goggle, ski goggle or swimming goggle. In a further embodiment, one or more electrical components can be in a strap tied to the corresponding eyewear, such as a sports strap tied to the corresponding sports eyewear.

In a number of embodiments, the temples of the glasses can have a tapered profile. Each of the temples is wider or broader when it is close to its corresponding joint. In one embodiment, a wider or broader temple implies that the temple spans across a wider or broader area longitudinally down from the top of the head of the user.

Depending on applications, a temple arrangement can be of different shapes. The shape can depend on the type of glasses. For example, the temple arrangement for fit-over glasses can be bigger than that of the prescription glasses. The shape can also depend on applications based on the electrical component(s) embedded or partially embedded in the glasses.

In one embodiment, the glasses include lenses. The glasses, such as the lens holders with the corresponding lenses, can use a wrap around style to better conform to the profile of the face of the wearer.

In another embodiment, each lens holder also has a shield at least at one of its edges. The shield can reduce the amount of light or radiation entering, for example, between the lens holders and the wearer's head, and received by at least one of the eyes of the wearer. The shields can be shaped to conform to the profile of the face of the wearer. In an example for fit-over sunglasses, when worn over a pair of prescription glasses, such shields can go over or cover at least a portion of the pair of prescription glasses. The shields can be opaque. Optionally, there can be transparent or translucent windows on these shields.

Note that in one embodiment, a pair of glasses does not have to include lenses.

Figure 3:
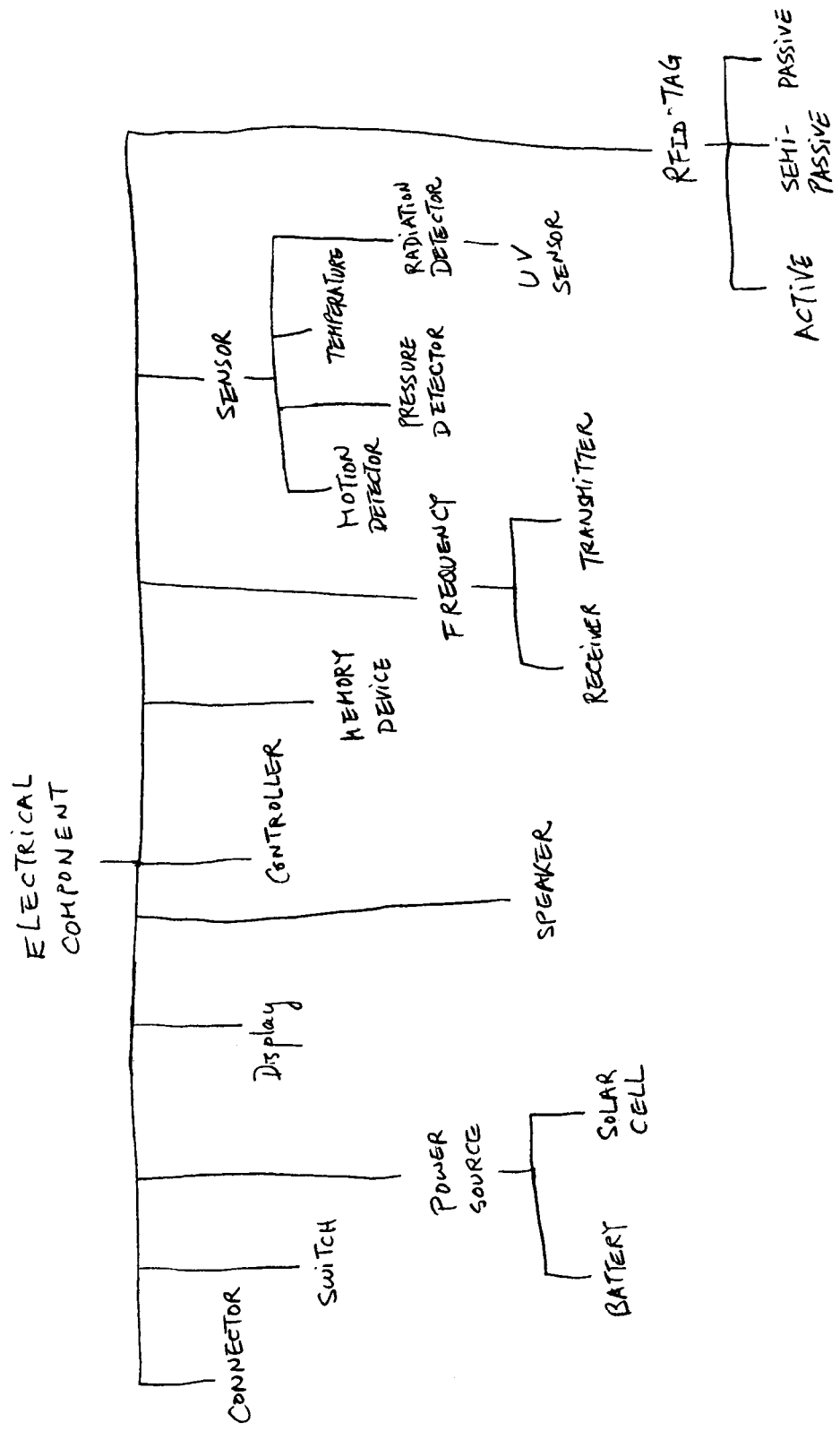
FIG. 3 shows examples of different electrical components partially or fully embedded in a pair of glasses according to the present invention.

In one embodiment, one or more electrical components are at least partially or fully embedded in a temple arrangement. Such an embedded electrical component can be an electronic clock. FIG. 3 shows examples of different electrical components according to the present invention.

In one embodiment, an electrical component in a pair of glasses is an electrical connector. The connector can be provided on one of the temples of the pair of glasses. The connector can be a male connector located at a temple tip. In another embodiment, the connector can be a female connector at a temple tip. As that temple tip grabs onto the main body of its corresponding temple, the female connector can make electrical contact with a male connector. Different types of connectors have previously been described in the related patent applications, which have been incorporated by reference.

In one embodiment, an electrical component in a pair of glasses is an electrical switch, such as one or more of those previously described in the related patent applications, which have been incorporated by reference.

In one embodiment, an electrical component in a pair of glasses can include a circuit board. The circuit board can be a rigid or a flexible circuit board.

In one embodiment, an electrical component in a pair of glasses can be a power source. The power source can be a battery, a solar cell or other type of power source.

In one embodiment, an electrical component in a pair of glasses is a speaker. The speaker can be facing the wearer when the glasses are being worn. The speaker can directly transmit to a user, such as a speaker mounted on an exterior surface of an eyeglass frame, or partially or fully embedded in an eyeglass frame, or a bone-conducting speaker.

A bone-conducting speaker transfers vibrations from bones in one's head, such as cheekbone, to the inner ear through bone-conduction technology. One advantage of a bone-conducting speaker is that it does not need an ear bud sticking into one's ear, or additional wires to transmit sound. Such wires or ear bud can be inconvenient, such as when one is swimming. Different types of bone-conducting speakers have previously been described in the related patent applications, which have been incorporated by reference.

Alternatively, the speaker can indirectly transmit sound to a user, such as through the use of a tube to delivery audio signals proximate to a user's ear.

In one embodiment, an electrical component in a pair of glasses is a memory device and/or processing circuitry. The memory device is for data storage. The processing circuitry controls operation of data acquisition with respect to other electrical components and/or processing of data.

In one embodiment, an electrical component in a pair of glasses is a frequency receiver or a frequency transmitter. They can be in the radio frequency range.

In one embodiment, an electrical component in a pair of glasses can be a sensor. The sensor can be a temperature sensor. The temperature sensor can be used to sense the temperature of the wearer, which can be based on heat conduction. In one embodiment, such a temperature sensor is in a temple tip. In measuring the temperature, the user can further press the temple tip towards the head of the user to ensure better connection. One can also stick the temple tip under one's tongue to measure body temperature.

In other different embodiments, an electrical component in a pair of glasses can be a motion detector, a speed sensor, a rate of ascent detector, a pressure detector, or a detector for radiation, such as an ultraviolet (UV) sensor.

In one embodiment, an electrical component in a pair of glasses is a radio frequency identification (RFID) tags. RFID tags typically include memory chips equipped with radio antennas. The memory chips usually do not include large amount of information. They may only have a few kilobytes, sufficient to encode, such as a serial number, where and when the product, such as the glasses, was manufactured, and other relevant information. A portion of such information can provide identifying information to the glasses.

These tags can come in a number of configurations. For example, an active tag uses a battery-powered transponder to constantly emit signals, carrying information programmed into the chip. Active tags are more applicable to situations where readers are not close to the tags. A semi-passive tag likewise has a battery, but may not be activated until it receives a signal from a reader. They are more applicable to situations that do not need continuous connection and accessing. A passive tag has no battery; its antenna extracts power from the reader's radio wave signal to transmit the identifying information on the chip. Passive tags are typically relatively inexpensive, but may have to be within a few feet of a reader to extract power. The electrical component can be a passive RFID tag, or some other type of tag.

In one embodiment, one or more electrical components in a temple arrangement interact with one or more electrical components in another part of the glasses or in a device tethered to the glasses. For example, there can be two temperature sensors, one in a temple tip and the other close to the hinge of the corresponding temple. The sensor close to the hinge is used to identify the temperature of the environment, while the sensor at the temple tip is used to measure the temperature of the wearer. In one embodiment, based on the differential output from the two sensors, the temperature of the wearer can be identified. Based on the differential output from the two sensors, the effect of the environment temperature is taken into consideration in identifying the temperature of the wearer of the glasses.

In another example, a temple of a pair of glasses holds one portion of an electrical circuit. That portion can include generic parts, such as a battery or a solar cell, a display, a memory device, a beeper and/or a controller (or processor), which can be programmable. The one or more electrical components can be on a printed circuit board. They can be generic components applicable to many different types of operations.

In one embodiment, another portion of the electrical circuit is in a temple arrangement. This portion can be application specific. For example, the battery to run a clock is in a temple, while the digital clock without its battery is in the corresponding temple arrangement.

In another example, a temperature sensor is in a temple arrangement, while a switch, a display, a processor, a memory device and a battery are in the temple. There can also be a thermal mass in the temple arrangement. With the thermal mass, the temperature of the sensor would not change too quickly. With the switch in the on position, the processor can cause the sensor to measure temperature. The processor keeps track of the temperature of the sensor as it changes. The information can be stored in the memory device.

In another embodiment, the temperature sensing glasses also have a beeper in the temple. When the sensor temperature does not fluctuate by more than a certain threshold within a preset amount of time, the beeper can produce a beeping sound. This indicates that the temperature is now stable.

One way to use a temperature sensor in a temple of a pair of glasses is as follows. First, one turns the switch on. Assume the person pushes the sensor so that it touches the head at the back of the ear of the user, and the temperature of the sensor starts to go up. A processor or controller keeps track of the temperature of the sensor. If the temperature does not vary by more than, for example, 0.1 degree in, for example, 5 seconds, the temperature is assumed to be in equilibrium. The processor keeps on calculating running averages. Once the fluctuation is below the preset 0.1 degrees, the beeper beeps. After the beeper beeps, the sensor stops measuring temperature, and the last temperature taken by the sensor will correspond to the temperature of the wearer. The display then shows this last temperature. This process can be re-started by turning the switch off and on.

In other embodiments, a motion detector, a speed sensor for skiing, a rate of ascent detector for diving, a radiation detector (such as a UV sensor), or a pressure sensor can be in a temple arrangement. Each of these sensors or detectors can work in conjunction with other electrical components in the glasses. Different types of UV or radiation sensing embodiments have previously been described in the related patent applications, which have been incorporated by reference.

In one embodiment, the glasses include an active RFID tag. Different electrical components can be in different parts of the glasses. For example, the battery can be in the temple, and the transponder of the tag can be in the corresponding temple arrangement.

In one embodiment, the glasses include electrical components for locating the glasses. This is an embodiment of an eyewear finder. Sometimes we do not remember where we placed or misplaced the glasses. This embodiment helps us find the glasses.

Figure 4:
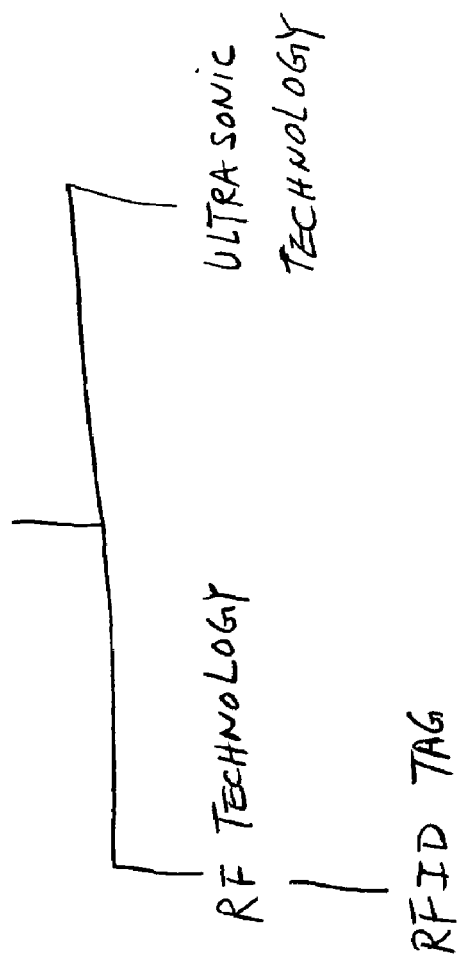
FIG. 4 shows eyewear finder components according to different embodiments of the present invention.
Figure 5:
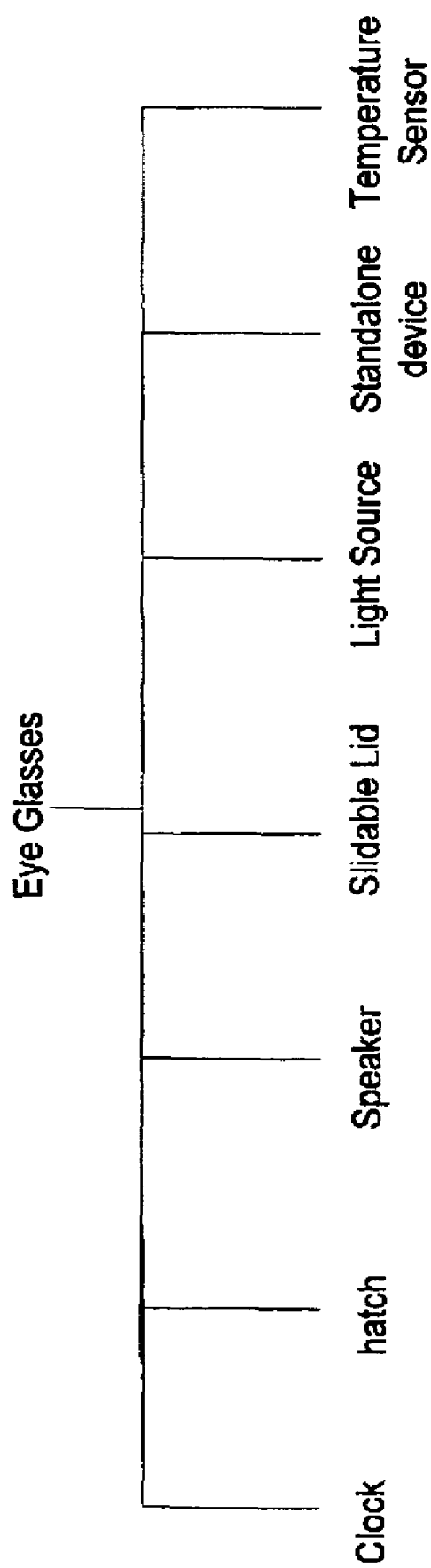
FIG. 5 shows a number of features regarding a pair of eyeglasses according to different embodiments of the invention.

FIG. 4 shows eyewear finder components according to different embodiments of the present invention. In one approach, the glasses include a semi-passive RFID tag, a battery and a speaker, such as a beeper. These components can be in the frames of the glasses. In another embodiment, some of its electrical components can be in the frame of the glasses, and some of its electrical components can be in a temple arrangement of the glasses. For example, its power source and beeper can be in one of its temples, and the tag in the corresponding temple arrangement. The tag is activated when it receives a specific signal from its reader or finder. The reader or finder can be a generator for specific RF signal. By pushing a button on the reader, the specific signal will be transmitted. When the tag gets the specific signal, the tag will activate the beeper, which will generate a beeping sound. As long as the user is within the hearing range of the beeping sound, the user will be able to find the pair of glasses.

In another approach for an eyewear finder, there is a RF receiver, an ultrasonic receiver or other types of receiver in the glasses, which can couple to a beeper. The receiver is designed to receive a specific signal. The finder can generate the corresponding signal, which can be RF or ultrasonic signals. When the receiver detects the transmitted signals, the receiver will generate a beeping sound, which can then help locate the position of the glasses. Typically, the finder is for short-range application, and can use technologies can be based on Zigbee, UWB, Bluetooth or WiFi standards.

Based on a number of embodiments described, retailers or distributors can provide after-market modification or enhancement to a pair of glasses. For example, this can be done by replacing existing temple tips with replacement temple tips of a pair of glasses.

A replacement temple arrangement can include different electrical components for different applications. Alternatively, the replacement temple arrangement can have similar electrical components, but is of different shape or color than the original one.

In another example, the distributors can have a whole range of temple arrangements in different colors and/or shapes and/or electrical components for a customer to select from. Once the customer has selected one, the distributor will insert that temple arrangements to the glasses and sell the glasses to the customer. The distributor can also permanently fix the temple arrangements to the glasses so that they cannot be removed from the glasses without distorting or breaking the glasses.

In yet another embodiment, the distributor can allow the customer the option of replacement temple arrangements after the customer has bought the pair of glasses (e.g., as long as the customer returns the glasses within a preset period of time). For example, the preset period of time is one week. The customer has the option to replace the temple arrangements bought with another set. If the prices are different, the customer will either get a refund or has to pay the extra amount.

Additional descriptions regarding temple arrangements have been disclosed in the related patent applications, which have been incorporated by reference.

In a number of embodiments, electrical components have been described to be fully or partially embedded in a temple of glasses, or in a temple arrangement. In other embodiments, the component(s) can be in other parts of the glasses, such as the lens holders, the nose pads, the bridges or the shields.

A number of embodiments have been described regarding glasses with a number of structural elements. In one embodiment, the glasses can utilize rimless frames. The glasses can include two lenses held together by a bridge. A temple can be attached to each lens through a joint that is connected to the corresponding lens by one or more screws. For example, there can be two screws at each lens to hold onto a temple piece, which includes a joint for a corresponding temple. One or more electrical components can be fully or partially embedded in the glasses, such as in a temple of the glasses.

In another embodiment, the electrical components, or at least some of the electrical components, in the glasses can be tethered to the glasses instead. A number of tethered embodiments have been described in related patent applications mentioned above and incorporated by reference.

In one embodiment, the electrical components can also pertain to an activity monitor, such as a pedometer. The activity monitor can be partially or completely embedded in a pair of eyeglasses. Typically, the activity monitor includes an activity sensor and electronic circuitry in the pair of eyeglasses that monitor the activity, process the monitored signals, and provide an output of an activity indication to the user or interested party. Additional details on activity monitors are described in related patent applications mentioned above and incorporated by reference The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

A number of embodiments in the invention can be implemented in software, hardware or a combination of hardware and software. A number of embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details.

The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Also, in this specification, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

The invention claimed is:

1. A pair of glasses comprising:
a first lens holder for receiving a first lens, the first lens holder having a first side and a second side;
a second lens holder for receiving a second lens, the second lens holder having a first side and a second side;
a bridge element coupling the first side of the first lens holder to the second side of the second lens holder;
a first temple pivotally secured to the second side of the first lens holder through a first joint;
a second temple pivotally secured to the first side of the second lens holder through a second joint;
a first temperature sensor at least partially embedded in the glasses; and
a clock at least partially embedded in the glasses.

2. A pair of glasses as recited in claim 1,
wherein the clock is located in one of the temples, with the clock facing the user when the user is wearing the glasses, and
wherein the glasses further comprises at least one solar cell adapted to provide power to at least the clock.

3. A pair of glasses as recited in claim 1,
wherein the clock is a digital clock with a liquid crystal display,
wherein the glasses further comprises a switch, which can turn the display on and off, with the clock continuously operating, and
wherein the glasses further comprises a power source adapted to provide power to at least the clock, and the power source is at one of the temples.

4. A pair of glasses as recited in claim 3 further comprising a hatch to replace the battery and the hatch faces the wearer of the glasses when the glasses are worn.

5. A pair of glasses as recited in claim 3, wherein the power source cannot be replaced without breaking the glasses.

6. A pair of glasses as recited in claim 1,
wherein the first temperature sensor is configured to measure a temperature of the wearer of the glasses,
wherein the clock is a programmable digital clock,
wherein the glasses further comprise a sneaker, and
wherein the clock can be programmed to audibly alert a user at a specific time with the sneaker.

7. A pair of glasses as recited in claim 1 further comprising:
a slidable lid that can cover the face of the clock; and
a light source that helps to illuminate at least the face of the clock.

8. A pair of glasses as recited in claim 1 wherein the clock is a standalone device with its battery, and the clock is situated inside a cavity in the glasses.

9. A pair of glasses as recited in claim 1,
wherein each temple has a first end and a second end, with the first end being the end that is pivotally secured to its corresponding joint,
wherein the second end of each temple has a temple arrangement,
wherein each temple arrangement can be removed from and re-inserted back onto the corresponding temple, and
wherein the clock is in one of the temple arrangements.

10. A pair of glasses as recited in claim 1, wherein a change of temperature measured by the first temperature sensor over a preset period of time is identified.

11. A pair of glasses as recited in claim 1 further comprising a processor and a memory device,
wherein, the memory device is configured to store at least some of the temperatures measured by the first temperature sensor, and
wherein the first temperature sensor is configured to measure a temperature of the wearer of the glasses.

12. A pair of glasses as recited in claim 11 further comprising a speaker and a display, wherein to measure the temperature of the wearer of the glasses,
the processor is configured to keep track of the temperatures measured by the first temperature sensor,
the processor is configured to determine the change of the measured temperature by the first temperature sensor over a preset period of time, and
if the change of the measured temperature of the first temperature sensor over the preset period of time is less than a predetermined threshold, the speaker is configured to produce at least an audible tone.

13. A pair of glasses as recited in claim 12,
wherein the clock is a digital clock with a liquid crystal display, and
wherein if the change of the measured temperature of the first temperature sensor over the preset period of time is less than a predetermined threshold,
the temperature is identified using at least the most recent temperature measured, and
the display shows the identified temperature.

14. A pair of glasses as recited in claim 1 further comprising a thermal mass to reduce the change of temperature of the first temperature sensor over a period of time.

15. A pair of glasses as recited in claim 1 further comprising:
a memory device, which is configured to store the temperatures measured by the first temperature sensor; and
an electrical connector, which is configured to allow electrical connection to the glasses.

16. A pair of glasses as recited in claim 1, wherein the first temperature sensor is at least partially embedded in one of the temples.

17. A pair of glasses as recited in claim 16,
wherein the glasses further comprises a second temperature sensor,
wherein the first and the second temperature sensors are configured to measure a temperature of the wearer of the glasses, and
wherein the temperature of the wearer of the glasses is identified using the difference in the measured temperatures of the two temperature sensors.

18. A pair of glasses as recited in claim 17,
wherein the first temperature sensor is located close to a joint of one of the temples, and
wherein the second temperature sensor is located close to the temple tip of one of the temples.

19. A method to operate a pair of glasses that bas a clock, a temperature sensor, a display and a processor, with the clock, the temperature sensor, the display and the processor being at least partially embedded in the glasses, the method, as implemented by the processor, comprising:
monitoring the temperatures measured by the temperature sensor
determining the change of the measured temperature of the temperature sensor over a preset period of time;
if the change of the measured temperature of the temperature sensor over the preset period of time is less than a predetermined threshold,
identifying the temperature using at least one temperature measured by the temperature sensor, and
showing the identified temperature of the wearer by the display.

20. A method as recited in claim 19,
wherein the glasses further comprise a speaker, which is at least partially embedded in the glasses, and
wherein if the change of the measured temperature of the temperature sensor over the preset period of time is less than the predetermined threshold, the method further comprises producing an audible sound by the speaker.

21. A method as recited in claim 20,
wherein the temperature sensor is configured to measure the temperature of the wearer of the glasses,
wherein the glasses further comprises a memory device, and
wherein the method further comprises storing at least some of the measured temperatures by the temperature sensor in the memory device.

* * * * *

UNITED STATES PATENT AND TRADEMARK OFFICE
CERTIFICATE OF CORRECTION

| | | |
|---|---|---|
| PATENT NO. | : 7,380,936 B2 | Page 1 of 1 |
| APPLICATION NO. | : 11/183263 | |
| DATED | : June 3, 2008 | |
| INVENTOR(S) | : Howell et al. | |

It is certified that error appears in the above-identified patent and that said Letters Patent is hereby corrected as shown below:

Column 12, line 5, "sneaker" should be --speaker--;

line 7, "sneaker" should be --speaker--; and line 32, "wherein," should be --wherein--.

Column 13, line 18, "bas" should be --has--.

Column 14, line 4, "comprises" should be --comprise--.

Signed and Sealed this

Fourteenth Day of April, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,380,936 B2  
APPLICATION NO. : 11/183263  
DATED : June 3, 2008  
INVENTOR(S) : Howell et al.

It is certified that error appears in the above-identified patent and that said Letters Patent is hereby corrected as shown below:

Column 12, line 1, (Claim 6, line 1) "claim 1." should be --claim 1,--;

line 3, (Claim 6, line 3) "glasses." should be --glasses,--;

line 5, (Claim 6, line 5) "sneaker" should be --speaker--;

line 7, (Claim 6, line 7) "sneaker" should be --speaker--; and line 32, (Claim 11, line 3) "wherein," should be --wherein--.

Column 13, line 18, (Claim 19, line 1) "bas" should be --has--;

line 24, (Claim 19, line 7) "sensor" should be --sensor;--.

Column 14, line 19, (Claim 21, line 4) "comprises" should be --comprise--.

This certificate supersedes the Certificate of Correction issued April 14, 2009.

Signed and Sealed this  
Twentieth Day of March, 2012

David J. Kappos  
*Director of the United States Patent and Trademark Office*